Aug. 22, 1961 A. A. OBERMAIER ET AL 2,996,911
DIRECT READING DEW-POINT METER
Filed June 21, 1957 3 Sheets-Sheet 1

Inventors
Alfred A. Obermaier
Edwin W. Donath
By Silverman, Mullin & Cass
Attorneys

2,996,911
DIRECT READING DEW-POINT METER

Alfred A. Obermaier, Park Ridge, and Edwin W. Donath, Arlington Heights, Ill., assignors to Illinois Testing Laboratories, Inc., Chicago, Ill., a corporation of Illinois Filed June 21, 1957, Ser. No. 667,219
26 Claims. (Cl. 73—17)

This invention relates generally to hygrometry, but more particularly is concerned with a direct reading dew-point meter.

While the subject matter of this invention is stated above to relate to hygrometry, it is desired to emphasize that this is a generic usage of the term, and not to be limited to the definition usually given, to the effect that hygrometry is concerned with the study of humidity of gases. The word "humidity" has acquired certain connotations relating to the quantity of moisture in a given gas—usually designated as air for simplicity of explanation. Thus, relative humidity is defined as the ratio of the mass of moisture actually present in any volume of a gas to the amount needed for saturation at the same temperature. Absolute humidity is defined as the actual mass of moisture contained in a given volume of air. The device of this invention is broader than such specific definitions.

Through experimentation, certain tables and charts have been worked out with considerable accuracy, from which one can determine relative and absolute humidity at given ambient temperatures when the wet and dry bulb temperatures are known. Determination of these temperatures is by means of psychrometers, such as the sling psychrometer in which two identical thermometers mounted on a single member are whirled through the air. One of the thermometers has its bulb encased in a moistened wick so that the evaporation of moisture will lower the temperature of that thermometer to a certain stable value. The greater the moisture in the air, the less the evaporation, and the less the depression of wet air temperature, that is—the less the difference between the two. Through these same tables it is also possible to ascertain the dew-point of the air from the psychrometrically measured data.

The dew-point is generally defined as the temperature at which the air (or the test gas under consideration) would be saturated by the moisture actually carried by it. It can be understood from the classical method of ascertaining dew-point devised by Regnault that if the temperature of a given atmosphere is slowly lowered by some cooling means to a temperature at which the moisture in the atmosphere just begins to condense, the temperature reached is the dew-point.

The knowledge of dew-point of gases, and even the dew-point of air has reached extremely important stature in recent years. Various industrial and laboratory procedures require continuous, accurate, and speedy information of the dew-point for the success of processes being carried out. Examples of these include wind tunnel research, and the heat treatment of metals. In the latter case, especially, the dew-point of the exhaust atmosphere in certain heat treating processes is a measure of certain vital conditions to which the treated metal is being subjected. The dew-point information is therefore used to control the process, and slow determinations and inaccuracies can be quite costly.

At present there are many different types of dew-point meters, including types which require refrigeration and types which use cloud chambers and relatively complex pneumatic and optical systems. These devices are for the most part fairly successful, although often they are expensive and require great skill in observation and operation, as well as in determination and interpretation of results. Examples of the first type are shown and described in the following U.S. Letters Patent, owned by the assignee of this application: Patent 2,649,707 issued August 28, 1953 to E. W. Donath and B. A. Ritzenthaler; Patent 2,697,933 issued December 28, 1954 to E. W. Donath; Patent 2,680,371 issued June 8, 1954 to E. W. Donath; and Patent 2,733,594 issued February 7, 1956 to I. I. Silverman. Examples of the second type, which utilize a cloud chamber, are shown and described in the following U.S. Letters Patent, owned by the assignee of this application: Patent 1,945,660 issued February 6, 1934 to M. Scott and Patent 2,566,307 issued September 4, 1951 to J. R. Boyle.

Several of the dew-point measuring devices of the above referred to patents are direct reading, but these are the type which require refrigeration, which is not always available at a remote location. These devices require considerable time between consecutive readings due to the inherent inertia of the systems. The apparatuses which utilize cloud chambers do not read directly but require reference to tables for the proper determination of dew-point. In addition they are actually batch devices, and not continuous flow apparatus.

The primary object of the invention is to provide a simple dew-point meter having a continuous, direct reading display of a quantity related to dew-point, eliminating the complex and expensive apparatus of previous devices and likewise eliminating the disadvantages thereof. The display of the dew-point is achieved by a suitable galvanometer which is calibrated to read dew-point directly.

The invention also has as an important object the provision of a dew-point meter which may be interposed in a continuous stream of air or test gas, as the case may be, and will give a continuous reading of dew-point without the need for making manual adjustments of any kind, once the required flow has started. This will be practically instantly in most cases. Certain phases of the invention relate to the use of some of the novel structure by means of which great advantages of the invention are achieved, notwithstanding manual adjustments are to be made.

The invention is characterized by a novel bridge circuit whose elements have been chosen to meet certain requirements which will be set forth in considerable detail in the specification which follows.

Although bridge circuits for the determination of humidity have been known for a great many years, to the best of our knowledge, there has never been a bridge circuit the output of which reads a quantity directly proportional to dew-point. Such prior humidity bridge circuits merely provide a relationship between wet and dry bulb temperatures, such as for example the circuit shown in U.S. Patent 856,944 issued June 11, 1907 to S. W. Cramer. There are many other variations, and a recent one is that shown and described in U.S. Patent 2,603,972 issued July 22, 1952 to F. Kahn.

In the latter patent, as in all but the most simplified of bridges, advantage is taken of the fact that the characteristic curves of dry and wet bulb temperaturre are substantially straight lines for the various percentage of humidity. Further, the bridges are relatively easy to construct and adjust because the characteristics of relative humidity are quite uniformly related, being generally equally divergent as the ambient temperature increases. To use such a device for the determination of dew-point, reference need be made to tables after the determination of humidity had been made, and even the construction of a device for the mathematical conversion of wet and dry bulb temperatures into dew-point would pose extreme difficulties because the correlation is almost incapable of being expressed by a simple mathematical formula.

Obviously, then, these prior bridges do not measure the same variable as dew-point. Specifically, in the Kahn patent above referred to, the bridge illustrated therein uses thermistors in the bridge which measure the independent variables—dry bulb and wet bulb temperatures. This concept is completely eliminated in the invention herein, which operates differently. In this respect, it is an important object of the invention also, to provide a bridge circuit for the direct measurement of dew-point in which one of the electrical elements in the bridge circuit is the equivalent of a standard wet bulb cell subjected to the sample gas of a predetermined dew-point.

It might be mentioned at this point that one of the characteristics of the bridge of the invention is that in theory a comparison is made between a wet bulb temperature device subjected to a test gas of unknown dew-point and a wet bulb temperature device subjected to the same gas at a dew-point of some constant standard value on the basis of which the determination is to be made. This value has been chosen as −20° F. after a study of the characteristics of the functions involved, for reasons which will shortly become more apparent. Practically, a standard cell of this description would be expensive to construct and would complicate the apparatus to such an extent, that all of the advantages of the various phases of the invention would not be achieved. Instead of such a standard cell, therefore, we prefer to employ an electrical equivalent, calculated from the well-known bridge equations, using the range of values over which the majority of determinations are to be made, and matched to the known characteristics of wet bulb and ambient temperatures for the said range. It will be appreciated that standard cells as described are feasible and would give the desired results.

The resulting characteristics of the bridge are totally different from those of the bridge of the Kahn patent above referred to, and this is borne out by the fact that the thermistor in the external portion of the Kahn bridge circuit changes the bridge current in a manner which decreases the bridge current when the ambient temperature increases. In the bridge circuit of this invention, the bridge requirements are totally different in magnitude and phase because the quantities being operated upon are different, and as well, the bridge current is increased with ambient temperature through the use of a thermistor outside of the bridge proper.

It will be understood from the description that follows that many advantages are inherent in the invention which will become apparent to those skilled in this art. For example, the dew-point measuring device of the invention requires no refrigeration, no heaters, no cloud chambers, and no optical or pneumatic systems. But for its galvanometer, it has no moving parts, except perhaps for a variable resistor which may be used in simplified versions thereof and in barometric corrections, if desired. It is direct reading in every sense, requiring no conversions, interpretations, and no reference to any tables. The test gas is directed to flow through the apparatus, and the meter reads dew-point. Furthermore, the signal which is produced instead of operating a meter can be used to operate a recording device, or may function as a feedback signal in automatic processes for maintaining fixed conditions.

Perhaps one of the most important accomplishments of the invention lies in the ability of the device to give the dew-point of the test gas for all ambient temperatures to which the apparatus may be subjected. An important object of the invention lies in the provision of structure making this possible.

The instrument embodying the invention is extremely compact in size. The simplicity belies the effectiveness of the apparatus, which may be easily made extremely accurate and reliable. Prior devices have been large and cumbersome, requiring continuous adjustment and careful and continuous calibration. These disadvantages are also eliminated by the invention.

Several other disadvantages inherent in prior dew-point determining devices are overcome by this invention. As to those devices which lower the temperature of the test gas until there is a deposit of moisture, it can be seen that when the dew-point is lower than 32° F. the deposit will be frost or ice, not readily driven off the collector without the use of some heating means. Accuracy often suffers because of super-saturation of the test gas. In these devices, as well as in the cloud chamber devices, time is lost between determinations. In effect, therefore, these are batch process devices, as opposed to continuous flow which is a truly unique feature of this invention. The continuous determination of dew-point through the use of the invention is a noteworthy achievement, especially since it is made possible without the need for complex valving and recycling means.

In order to explain the construction and operation of the invention, preferred embodiments have been illustrated and, in addition, charts have been used in an effort to provide a complete understanding of the theory and operation of the invention. Certain circuits are illustrated diagrammatically, using conventional symbols and notations which are intended to simplify the explanation. Where the same or like elements are illustrated, the same characters of reference are usually utilized. Resistors and other elements have been given reference characters, and throughout the text, where the explanation relates to the resistance, etc. of such elements, the identical characters are used to express the same. For example, the resistors $R_1$ is said to have a resistance of $R_1$ ohms.

Figure 1:
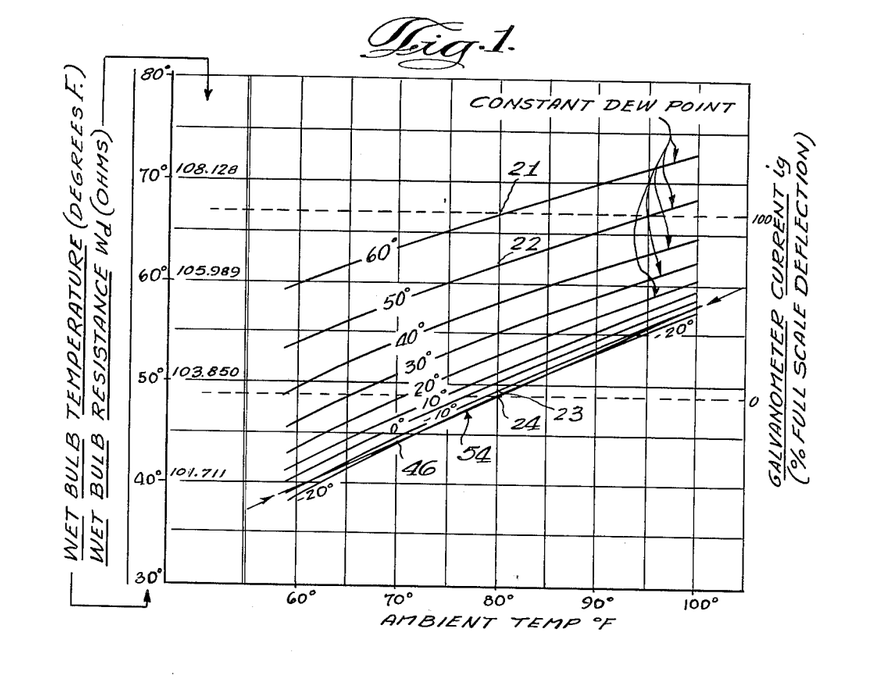
FIG. 1 is a chart illustrating the wet bulb temperature in degrees Fahrenheit versus ambient temperature in degrees Fahrenheit for dew-points between −20° F. and 60° F. inclusive. Other data are related to wet bulb temperature along the Y-axis.

In FIG. 1 there is shown a chart which illustrates the wet bulb characteristics of a gas such as for example air, over the range of ambient temperatures of about 60° F. to about 100° F. for various dew-points. This range is that in which the majority of determinations will be made, and extrapolation, if desired, is a relatively simple matter above and below the limits shown. The range of dew-points is from −20° F. to 60° F. which is also a range in which most commercial processes will be operating.

Studying this chart, one can immediately see that there are several important points which pose problems in the production of an instrument of the type here contemplated, but in addition there is a feature which is advantageous, and the recognition of which forms an important achievement. In the first place, for any given ambient temperature, such as for example 80° F., the dew-point varies with the wet bulb temperature almost logarithmically, the difference of wet bulb temperature between equal degrees of dew-point increasing with increase in dew-point. Thus, note that the point designated 21 occurring on the 60° F. constant dew-point line at 80° F. ambient (dry bulb) temperature represents a condition in which the wet bulb temperature would have measured 66.80° F. Between the point 21 and the point 22, which occurs on the 50° F. constant dew-point line at 80° F. ambient, there is a difference of 4.95° F. On the other hand, between the points 23 and 24 which are on the −10° F. and −20° F. constant dew-point lines, the difference in wet bulb temperatures measured is only .44° F.

In the second place, the constant dew-point curves are not parallel, but converge with increase in ambient temperature, and neither are they straight line functions. In this latter respect, the important factor which has been recognized and applied to the invention is that the −20° F. constant dew-point line is very close to being a straight line. Thus, the problem of devising an apparatus for direct reading of dew-point can be solved advantageously by basing the principle of operation upon this fact. The requirement that the device read directly irrespective of ambient temperature is more easily met if the starting point is devising an electrical circuit such that a galvanometer, for example, has a constant reading representing −20° F. dew-point for all values of ambient temperature.

It will be appreciated that the achievement of this will provide a highly useful instrument, even if we disregard the convergent nature of the constant dew-point lines, because, for small changes of ambient temperature, a practical degree of dew-point accuracy is possible, depending upon the principal ambient temperature about which the measurements are being made, and the ambient temperature for which the device has been designed. For example, if we neglect the convergence of the characteristic curves, and the circuit has been designated to give best matching to the dew-point curves at 80° F. ambient, obviously changes of ambient temperature in the vicinity of 80° F. will not result in gross errors.

Continuing with the explanation of the invention, if we consider only the 80° F. ambient temperature condition, it will be obvious that the wet bulb temperature varies as the dew-point. That is actually true of any constant ambient temperature, but of course, the information cannot be applied to any instrument because of extremely large error with each degree change of ambient temperature. This condition can be illustrated by means of the bridge of FIG. 2.

Figure 2:
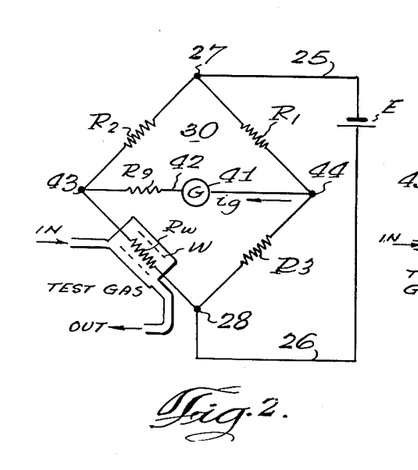
FIG. 2 is an electrical circuit diagram of a Wheatstone bridge used to explain the theory of the invention.

In FIG. 2 there is illustrated an ordinary Wheatstone bridge 30 which may be used to measure the dew-point for a condition in which the ambient temperature remains constant, say at 80° F. The conventionally located branches of the bridge contain the fixed value resistors $R_1$, $R_2$ and $R_3$ as well as the variable temperature sensitive resistor $R_w$. There is a source of potential E connected by leads 25 and 26 to the potential terminals 27 and 28 of the bridge. A galvanometer 41 is connected in the lead 42 extending across the usual detector terminals 43 and 44. Current $i_g$ flows in the lead 42, in an amount depending upon the values of the resistors and the voltage of the source E. At zero $i_g$, the condition for balance, the usual balanced bridge equation applies:

$$\frac{R_1}{R_2} = \frac{R_3}{R_w} \quad (1)$$

$R_g$ represents the resistance of the galvanometer and is considered only in determining the equivalent resistance of the bridge for purposes to be mentioned hereinafter.

In this equation $R_w$ represents the resistance of a temperature sensitive element $R_w$, subjected to the flow of test gas whose resistance varies linearly with temperature. This element is enclosed in a moistened wick W. A preferred element is a platinum bulb whose resistance is of the order of 100 ohms at a temperature of 32° F. and which increases .2139 ohm per degree F. $R_1$, $R_2$ and $R_3$ can be chosen using the well-known bridge equations for maximum sensitivity of the bridge and in view of the range of deflection required of the meter 41 so that balance, i.e. zero deflection, is obtained at the condition where the ambient temperature is 80° F. for a dew-point of −20° F. and this is of course the point 24. At this condition, the resistance of the wet bulb element $W_d$ is approximately 103.636 ohms. Note that the graph of FIG. 1 shows the resistance of the element $W_d$ along the vertical or Y-axis of the chart with the wet bulb temperature.

Obviously, for maximum sensitivity, the various resistors inside of the bridge will be the same order of resistance, namely, about 100 ohms, since that is generally the order of resistance of the wet bulb element $R_w$. The total deflection of the galvanometer 41 of the bridge will be the range of dew-point over which it is desired to operate, and as seen from the chart of FIG. 1, the total range of change of the wet bulb temperature only amounts to about 20° F. For any ordinary size of galvanometer, if the total deflection represents the range of dew-points from −20° F. to 60° F. comparatively great accuracy has been achieved.

In case the maximum deflection is to occur at 60° F. dew-point when the ambient is 80° F., then the current $i_g$ which will be flowing through the galvanometer chosen can be determined from the value of $R_w$ at that particular condition, and the unbalanced bridge equation used to ascertain the required voltage E. The equation is as follows:

$$E = i_g \frac{R_1 R_w (R_3 + R_w) + (R_1 + R_2) R_3 R_w + R_g (R_2 R_3 + R_1 R_w + R_3 R_w + R_1 R_2)}{R_1 R_w - R_2 R_3} \quad (2)$$

As stated above, $R_g$ is the internal resistance of the galvanometer 41. $R_w$ in this case would be the resistance of the wet bulb element $R_w$ at the point 21 in FIG. 1. The bridge had been balanced at −20° F. dew-point and at an ambient temperature of 80° F. and while the value of $R_w$ was considerably lower.

Through the use of this kind of technique the values of the bridge elements can be worked out for other ambient temperatures, both as to the internal values (which in case of the bridge 30 are relatively simple) and as to the external values for proper current flow through the galvanometer.

It will be recalled that the range over which our bridge is desired to operate is from −20° F. dew-point to 60° F. dew-point, and hence the upper limit of the measurements to be made may be chosen as point designated 21. We are still considering a constant ambient temperature of 80° F. Thus, the full scale deflection of the bridge galvanometer 41 will be between the two points 21 and 24, and an $i_g$ scale can be placed as shown along the Y-axis also, because it can be shown mathematically that the bridge current will vary linearly with the small changes of resistance of the wet bulb element $R_w$ if the resistance of the other resistors remains constant.

The voltage of the source E will be chosen from the solution of Equation 2 depending upon the kind of meter 41 used, the resistance of the meter element, represented by the equivalent resistor $R_g$, and the range of the meter 41, or total deflection, i.e. maximum $i_g$.

Obviously this circuit, while pointing the way to a direct reading dew-point meter has practical limitations. The ambient temperature never remains constant, and hence variations of ambient temperature will automatically result in a very substantial error. Related to full scale deflection, such error is about 3% of full scale deflection for each degree F. change in ambient temperature. The important point which we can emphasize, however, is that the wet bulb temperature is a function of the dew-point only, for constant ambient temperature.

Since the element $R_w$ is linear with temperature, it will become apparent that if any ambient temperature is chosen, we can compute the values of $R_1$, $R_2$ and $R_3$ which if combined with the same element $R_w$ and using the same galvanometer 41 will vary as the dew-point for different wet bulb temperatures. In other words, if we chose the ambient temperature 70° F. and computed the bridge values so that $i_g$ is zero when the wet bulb temperature is 44.3° F. corresponding to a value of resistance of the element $R_w$ equal to about 102.631 ohms, the galvanometer will read dew-point directly as the wet bulb temperature increases. The —20° F. dew-point at 70° F. ambient temperature is designated 46.

This circuit would be useful where the bridge values are computed for a given ambient temperature and all determinations are made at this temperature. As pointed out above, this is not practical.

The invention contemplates varying the constants of the bridge 30 in accordance with such a function as to cause the bridge itself to automatically compensate for changes in ambient temperature so that the galvanometer 41 reads dew-point directly independent of ambient temperature.

Figure 3:
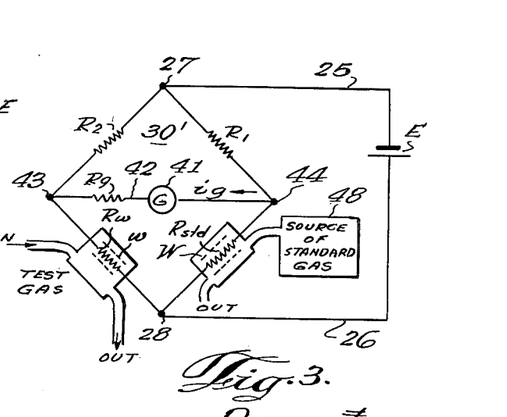
FIG. 3 is an electrical and gas flow circuit diagram of another Wheatstone bridge constructed in accordance with the invention, and arranged to provide a direct reading of dew-point.

One direct method of doing this would consists of substituting what may be termed "a standard cell" for either of the resistors $R_2$ or $R_3$ so that the bridge Equation 1 set forth above becomes $$\frac{R_2}{R_1} = \frac{R_w}{R_{std}} \quad (3)$$

where $R_{std}$ is the resistance of the standard cell. (In this case the standard cell has been substituted for $R_3$.) This is shown in FIG. 3 which illustrates the bridge diagrammatically. The element $R_{std}$ is identical in characteristics to the element $R_w$, but instead of being subjected to the test gas, it is subjected to a standard gas of known dew-point at the identical ambient temperature and pressure as the test gas. For example, in the bridge 30' of FIG. 3 the standard gas is chosen to have a constant —20° F. dew-point. Practically this may be done by means of dessicating equipment, or the like. The source of this standard gas causes the gas to pass over the element $R_{std}$ which, like the element $R_w$ is subjected to moisture by means of a wick W dipping into water. The standard gas has the identical ambient temperature and standard pressure as the test gas and hence the resistance of the element $R_{std}$ follows the characteristic of the constant —20° F. dew-point line and varies directly with the wet bulb temperature along the —20° F. dew-point line.

The expense and complexity of apparatus which will accomplish the requirements of providing a standard gas for application to the standard resistance element $R_{std}$ render the structure cumbersome and inconvenient. It has been described, however, because under certain circumstances it can be used to accomplish the purposes of the invention. The explanation of this apparatus, in connection with FIG. 3, also demonstrates the basis for the invention, and assists in the understanding thereof.

According to the invention, in place of a standard cell there may be provided an electrical network whose characteristics vary exactly as a standard cell or as nearly so as practical. As in the case of the standard cell, the bridge containing the network in its appropriate leg will provide zero balance for —20° F. dew-point (or any other dew-point which serves as the lowest value it is desired to indicate). This balance condition is maintained for all ambient temperatures, automatically by virtue of the manner in which the resistance of the network changes in response to changes in temperature.

Such a network will be temperature sensitive and contain such resistance elements as will meet the requirements for balancing the bridge at the —20° F. dew-point over the range 60° F. to 100° F. or whatever range the instrument is designed to cover. The network will have one or more each of active and passive elements in order, in its simplest form, to balance the bridge along the —20° F. dew-point line of FIG. 1 with a small error, of about plus or minus 2% of full scale deflection. Two forms of network can be used and substituted for the appropriate fixed resistor of the bridge, in view of the balance Equation 1. The first form would be a positive coefficient temperature sensitive element having series and/or parallel fixed resistors which will provide the necessary changes in the bridge characteristics, substituted for either resistor $R_2$ or $R_3$. The second form would be a negative coefficient temperature sensitive element having series and/or parallel fixed resistors, substituted for the resistor $R_1$. Theoretically, a single element is all that is required, but practically the fixed resistors are required to adjust the values of commercially available temperature sensitive elements. Probably one element and one parallel or series resistor is all that would be required in most cases.

Figure 4:
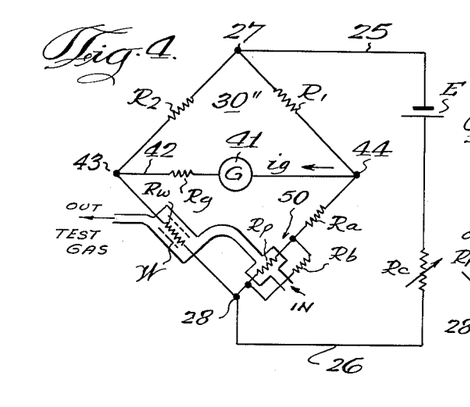
FIG. 4 is an electrical circuit diagram of another Wheatstone bridge which is approximately the electrical equivalent of the bridge of FIG. 3.

A typical bridge of the construction described is shown in FIG. 4, designated 30" and having generally the same elements as bridges 30 and 30' but with an artificial or simulated cell in place of the resistor $R_3$ or the standard element $R_{std}$. The artificial or simulated cell can be termed a network 50, and comprises a positive temperature coefficient element $R_p$ which is in parallel with a fixed resistor $R_b$, or in series with a resistor $R_a$. Both of these resistors are not needed, although both are shown. The practical example of this bridge utilized a platinum temperature sensitive bulb for the element $R_p$ which was identical to the wet bulb resistance element $R_w$ to make the construction simple. The element $R_p$ is subjected to the same gas as the element $R_w$ but is not wetted. The fixed modifying resistor (or resistors) enables the network 50 to follow a straight line approximation of the standard cell curve, somewhat as shown in FIG. 1. As previously mentioned, since the —20° F. dew-point is so close to a straight line, a simple network such as the network 50, using either of the resistors $R_a$ or $R_b$ and the temperature sensitive element $R_p$, gives a very good approximation.

In computing the values of the elements of the bridge 30" the equation for the balanced bridge (1) can again be used. Instead of $R_3$, however, the resistance of the network 50 must be substituted. This will be either $$(R_a + R_p)$$

or $$\frac{R_p R_b}{R_p + R_b}$$

depending upon the circuit. Since in this case $R_p$ is a variable, the values of the elements of the bridge can be worked out by solution of the bridge equation for two values of ambient temperature, since the exact value of $R_p$ at any temperature is known, as will be the values of $R_w$.

Increased accuracy in closely following the —20° F. constant dew-point line for all values of ambient temperature over the desired range of 60° F. to 100° F. can be achieved by combinations of elements in a network. Thus, in FIG. 5 there is illustrated a network 52 which has a passive element $R_a$ and an active element $R_p$ similar to those of the network 50 of bridge 30″ (considering that $R_p$ and $R_a$ form the network being discussed) but in addition there is a shunt about the element $R_p$. This shunt consists of a negative coefficient temperature sensitive element $R_n$ in series with a resistor $R_b$ for adjusting its value, so that the shunt varies with ambient temperature also, causing the total resistance between the terminals 28 and 44 to increase with temperature in a manner which more accurately simulates the electrical equivalent of the standard cell described. This could well follow at least a portion of the curvature of the −20° F. constant dew-point line, since, as will be seen in FIG. 1, it is not a straight line function. It will be recalled that a network such as 50 in the bridge 30″ of FIG. 4 would give a straight line function following the straight line designated 54 in FIG. 1. Such a straight line function gives good accuracy for the lower values of dew-point, but the accuracy decreases for the higher values of dew-point.

The exact simulation of a standard cell to perfectly follow the −20° F. dew-point line would require increased complexity in the circuit because of the additional active and passive elements. Cost may also materially increase, as for example, in case the negative temperature coefficient element is a negative feedback amplifier. Such refinements are not necessary for most instruments, however, and hence in a commercial example it is more likely that the networks described in connection with FIG. 4 would be used rather than that of FIG. 5.

Figure 6:
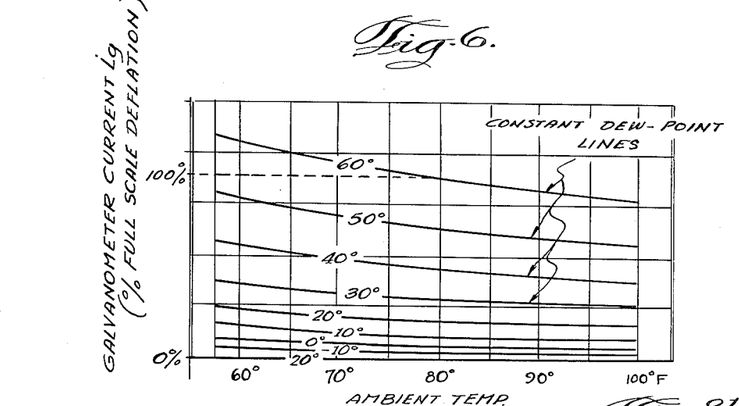
FIG. 6 is a chart illustrating the galvanometer deflection versus ambient temperature characteristics at various constant dew-points of a device constructed as illustrated in FIG. 3.

Consider that we have a perfect balance at all ambient temperatures for test gas having a dew-point of −20° F., through the use of a perfect standard cell, or a perfect simulation network. Since the constant dew-point characteristics are convergent, as shown in FIG. 1, the circuit will still produce an error. This is best seen in the graph of FIG. 6 which shows the galvanometer deflection for ambient temperature at the dew-points for the range −20° F. to 60° F. based on the use of a perfect standard cell or simulation network. If we had chosen about 80° F. ambient as the calibration temperature, obviously at the higher dew-points the galvanometer will read too high above 80° F. ambient, and too low below 80° F. ambient. In other words, the error is substantial at both ends of the ambient temperature range, although for all values of dew-point up to about 30° F. the error may well be negligible in most industrial and laboratory uses.

Looking at the bridge thus far in another light, the maximum percent of full scale deflection error occurs at the highest dew-point and the minimum percent of full scale deflection error occurs at the lowest dew-point. Since the constant dew-point curves are further apart as the dew-point increases, the percent error in terms of dew-point is very small even at 60° F. dew-point. Obviously the galvanometer scale calibrated in ° F. dew-point temperature will be generally logarithmic if an electrically linear galvanometer is used.

As an example of this, note that the worst error which can occur is at an ambient temperature of 60° F. and a dew-point of 60° F. This is only five or six dew-point degrees of error. At dew-points up to almost 0° F. the error is practically negligible, even at 60° F. ambient.

The bridge 30″ with the network 50 or the network 52 or some other network which will simulate a standard cell 47 will produce excellent results for most purposes. The galvanometer 41 reads dew-point directly irrespective of the ambient temperature variations, with little error except at one end or the other of the ambient temperature range, and then only at the higher dew-points. Obviously, if the principal range of operation is to be at one end of the ambient temperature range or the other, the calibration can be chosen at such end, and the values of the bridge elements computed with this in mind.

While it may be possible to work out the details of a bridge which will give a galvanometer current that follows the constant dew-point lines for all values of ambient temperature and all dew-points, practically it is a most involved procedure. The resulting structure would be complex and difficult to construct, maintain and operate. It is preferable to correct for the error at the higher dew-points and at the opposite ends of the ambient temperature range in the manner described hereinafter.

Above the 80° F. ambient calibration temperature, the total bridge current is increased to increase $i_g$ for all values of dew-point in proportion to the dew-point, considereing that at −20° F. dew-point the increase is zero because the bridge was constructed to be balanced at that value (see FIG. 6). For values of ambient temperature below 80° F. the total bridge current will be similarly decreased. As a result of complete correction, the characteristics of FIG. 6 would be horizontal straight lines, with each dew-point represented by a unique value of $i_g$ or galvanometer deflection. This, of course, is the idealized result.

Figures 5, 7:
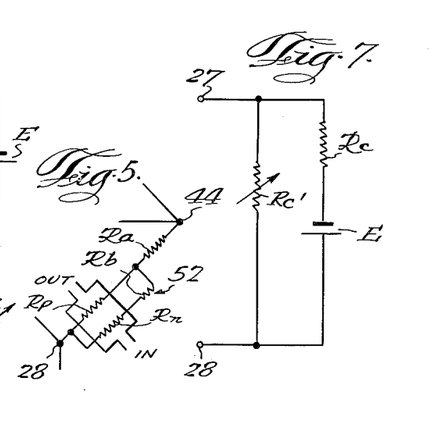
FIG. 5 is an electrical circuit diagram of a leg of the bridge of FIG. 4 illustrating a network more closely simulating a standard cell than the network in the same leg of the bridge of FIG. 4.
FIG. 7 is an electrical diagram of a variation in the circuit external of the bridge itself which is suitable for correcting the bridge of FIG. 4, for example, more closely to give direct readings of dew-point over the entire ambient temperature range.

There are several ways of achieving this correction, one of which requires manual adjustment of the total impedance of the bridge battery circuit through the use of a series resistor, such as the resistor $R_c$ in the bridge 30″. This resistor may be calibrated in any suitable manner to apply the desired correction of bridge current. A shunt resistor $R_{c'}$ might be used in place of the resistor $R_c$ or together with the resistor $R_c$ to apply the correction. Thus, various combinations both in series or shunt or one of each may be used. FIG. 7 shows a typical structure.

Figure 8A:
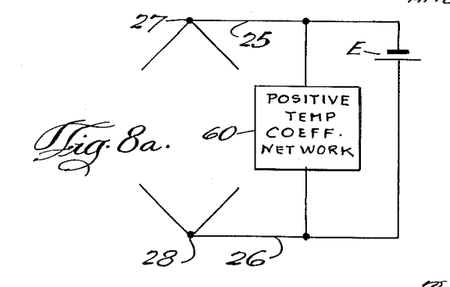
FIGS. 8a and 8b are diagrams similar to FIG. 7 illustrating means for making the same correction automatically.
Figure 8B:
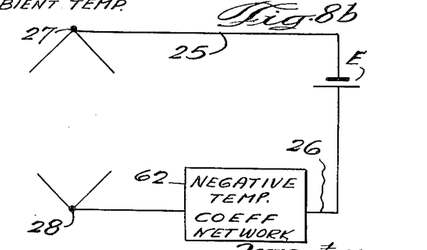

The more desirable method of achieving this correction is through the use of a network which will adjust the current of the bridge automatically with change in ambient temperature. Since the current must be increased for higher values of ambient, and decreased for lower values of ambient, a suitable positive temperature coefficient network in parallel with the bridge voltage source will produce the correction, or a suitable negative temperature coefficient network in series with the voltage source will accomplish the correction with proper adjustment of the impedance of the voltage source. The resulting bridges are shown in FIGS. 8a and 8b in diagrammatic form. The terminals 27 and 28 are identical to the terminals 27 and 28 of the bridge 30″ for example, the bridge not being shown but obviously intended to be connected across these terminals. In FIG. 8a the positive temperature coefficient network 60 is connected across leads 25 and 26 in parallel with the bridge and source of potential E, while in FIG. 8b the negative temperature coefficient network 62 is connected in series with the bridge and the source of potential E in lead 26.

Positive temperature coefficient elements known are platinum, nickel or other metal resistance thermometer bulbs, such as used in $R_w$ and $R_p$. The coefficient of nickel is the highest, being .303% change in resistance per degree Fahrenheit at a temperature of 70° F. The maximum rate of change of such elements is still too small for the circuit of FIG. 8a to be used without some additional component such as a positive feedback electronic amplifier. Thus, the block 60 of FIG. 8a includes the consideration of use of such an amplifier to increase the effect of the positive temperature coefficient elements.

The thermistor, on the other hand, provides an adequate rate of change of resistance with change of temperature and hence is ideally suited for use in the circuit of FIG. 8b. The available thermistors will usually not provide the desired characteristics without some minor change in the impedance of the source E.

Figure 9:
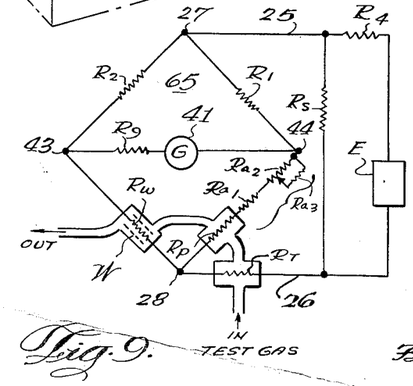
FIG. 9 is an electrical circuit diagram of a practical apparatus constructed in accordance with the invention.

In FIG. 9 there is illustrated a practical circuit for industrial use, operating over the ranges described, namely, to read dew-point directly from −20° F. to 60° F. over an ambient temperature range of 60° F. to 100° F. This structure has been successfully tested and gives excellent results. Obviously, where the requirements of the ranges used are different there would be adjustments in the values of the elements of the circuits, but the principles of operation and structure will basically be the same. The increased accuracy occasioned by the use of a modified circuit similar to that of FIG. 5 was not found necessary in the particular device, hence a network like 50 was used as will be noted.

The bridge is designated 65 and has the fixed arms $R_1$ and $R_2$. The value of $R_2$ was selected as 100.000 ohms and the value of $R_1$ computed to be 221.867 ohms. The elements $R_p$ and $R_w$ were identical platinum resistance bulbs having a resistance of 100 ohms at the ice point, i.e., 0° C.

The bridge galvanometer had a resistance $R_g$ of 135.135 ohms and a full scale current of .037 milliampere corresponding to a full scale potential drop of 5 millivolts. The correction resistor $R_a$ of FIG. 4 was modified to render the same variable for barometer correction through the use of a potentiometer. Thus, $R_a$ is a collective resistance element formed of series resistor $R_{a1}$ and the series potentiometer $R_{a2}$. The shunt resistor $R_{a3}$ is connected between the terminal 44 and the potentiometer slider. The overall resistance of the element $R_a$ is 119.572 ohms, chosen at standard barometric pressure. The values of the resistors $R_{a1}$, $R_{a2}$, and $R_{a3}$ can be chosen to make the slight changes in the curves of FIG. 1 which are required in order to correct for barometric changes.

$R_T$ is a thermistor which has a resistance of 125 ohms at a temperature of 70° F. and drops to 77 ohms if the temperature increases 20° F. to 90° F. $R_s$ is a shunt resistor of 101.25 ohms and $R_4$ is a series resistor of 99.52 ohms. E equals 5 volts D.C. The voltage source indicated at E may be arranged to provide 5 volts D.C.

The total current supplied to the bridge in order to cause the galvanometer current to vary for correction of the variations of dew-point seen in FIG. 6 will for the most part be affected by the changes in resistance of the thermistor $R_T$. $R_T$ is, therefore, subjected to the same test gas as the elements $R_p$ and $R_w$, although it will be noted that it is advisable to have the gas pass over the dry elements $R_p$ and $R_T$ before it passes over the wick W, since the dry elements will not change the temperature of the test gas while the moistened wick may. The total impedance of the circuit is adjusted by the resistors $R_s$ and $R_4$.

The values of the elements are computed by the use of bridge equations and network mathematical techniques. Computations are carried on using points along the constant dew-point curves for solving the various equations. In the practical example, the 70° F. and 90° F. ambient temperature points were used, since they covered the desired range.

Another method of correcting the error at higher dew-points caused by variation in the ambient temperature is to insert an adjustable series resistor or a temperature sensitive network in the galvantometer branch 42 of the bridge, such as the bridge 30″ of FIG. 4. In such a case the bridge is supplied by a constant potential source E, and as in the case of the external correction circuits, the network can be either a suitable positive coefficient network in parallel with the galvanometer or a negative temperature coefficient network in series with the galvanometer. Probably the latter would be more effective because of the characteristics of thermistors.

Figure 10:
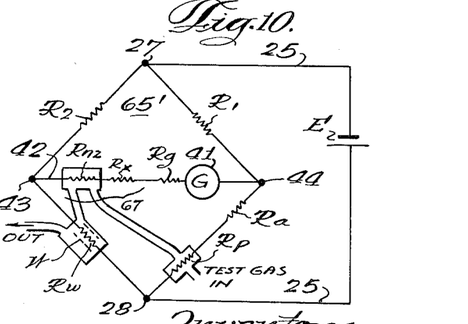
FIG. 10 is a circuit diagram of another form of the invention.

An example of such a circuit is shown in FIG. 10 in which the bridge 65′ is similar in all respects to the bridge 30″ except for the network 67 connected in series with the galvanometer 41. The network 67 comprises a negative coefficient temperature sensitive element $R_{n2}$ comprising a thermistor or the like in series with a passive resistor $R_x$. Provision is made for leading the test gas to flow about the element $R_{n2}$. It is believed unnecessary to illustrate the form with a manually adjustable resistor and that with a positive coefficient element in parallel with the galvanometer.

Various combinations of internal and external correction networks can be used to achieve the desired results. To use a combination of two networks, one internal of the bridge and one external of the bridge, either of which could supply the required correction by itself would of course unnecessarily complicate the circuit. In the case where neither of the networks could supply the required correction by itself due to the active elements having too small a rate of change of resistance with temperature, as might be the case where only resistance bulbs of positive coefficient characteristics were being used, the combination would give a total correction which, being the sum of the individual corrections, might suffice. It is to be understood that we are still referring to the correction made to a circuit already provided with a network for simulating the standard cell or with a standard cell.

Figure 11:
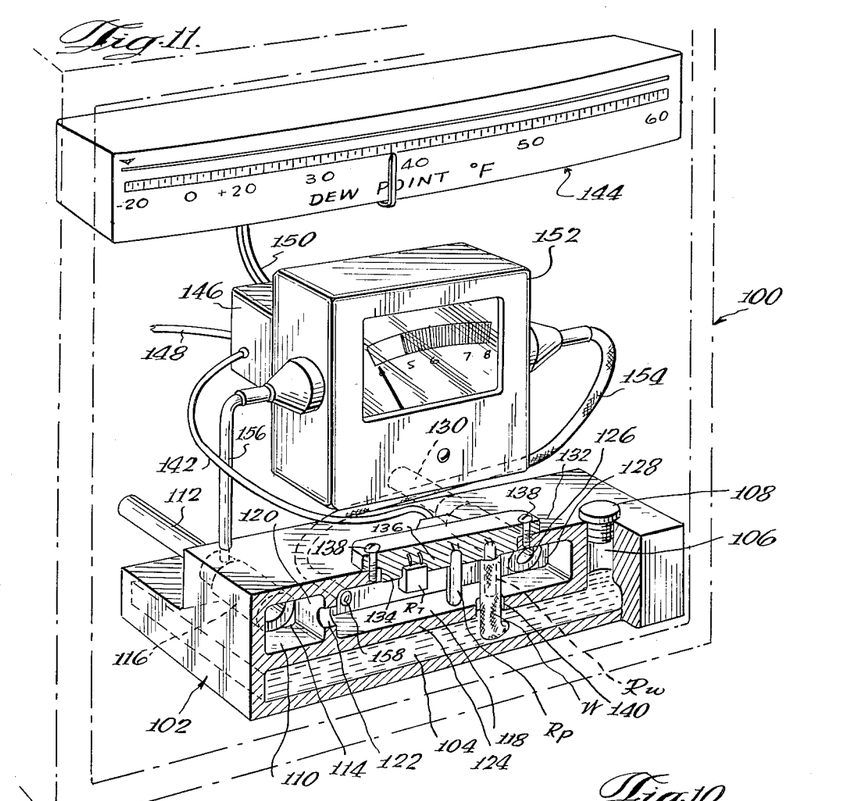
FIG. 11 is a semi-diagrammatic illustration, in perspective, of a complete dew-point meter constructed in accordance with the invention.

In FIG. 11 there is illustrated an arrangement suitable for commercial use. The entire apparatus is self contained, except for connection to the test gas inlet and exhaust if any, and a connection to an electric line, such as a 60 cycle 115 volt source. The reference character 100 is used to designate a housing of any suitable structure, shown in phantom lines, having the apapratus associated therewith. In the bottom of the casing there is an enclosed rectangular multi-chambered unit 102 which provides a well or sump 104 which is adapted to be filled with water through an inlet 106 opening to the top of the unit 102. The inlet is capped at 108, this portion of the unit protruding from the front of the casing 100 by an amount sufficient to give ready access to the cap 108. The sump 104 extends a substantial distance rearward into the casing so that relatively large supply of water may be provided. Means may be provided to render the water supply visible, such as for example, as done in the commercial structure, by forming the entire unit 102 from some inert plastic material such as methacrylate resin. This also renders the other chambers visible, enabling ready adjustment of some of the elements, and also enabling the operator to check the device for cleanliness, etc.

An air inlet chamber 110 is also formed in the unit, on the left hand side as viewed in FIG. 11, and a suitable conduit 112 enters the inlet chamber 110 through the rear wall 114 thereof, the opening in the chamber 110 being covered by a low pressure drop air filter 116. The chamber 110 is separated from the hygrometric chamber 118 by means of a partition 120 which has an orifice 122 to direct the stream of air over the elements disposed in said chamber 118. There is a wall 124 defining the top of the sump 104 and separating the same from the chambers 110 and 118. Air (or a test gas) passes through the chamber 118 and out the port 126 disposed in the rear wall 128 on the right hand end of the chamber 118. The port 126 leads to an exhaust line 130 or the atmosphere.

The top wall 132 of the unit 102 has an elongate opening 134 immediately over the chamber 118 and an elongate rubber plug 136 is disposed in said opening 134 and held in place by suitable screws 138. The active elements of the bridge of FIG. 9 are embedded in said plug, being disposed in proper arrangement during the molding of said plug and having their leads all connected as much as possible within the plug which thus holds them in proper relationship, and insulated from one another as required. Thus, the element $R_T$ is arranged on the left, the element $R_p$ is disposed in the center, and the element $R_w$ is disposed at the right hand end, all depending into the chamber 118. The elements $R_p$ and $R_T$ of the bridge 65, it will be recalled, are exposed to the test gas, but are not moistened as the element $R_w$. The element $R_w$ has a suitable wick W surrounding the same and dipping into the water of the sump 104 through an opening 140 formed in the separating wall 124.

It will be recalled that the positions of the temperature sensitive elements $R_T$, $R_p$ and $R_w$ with respect to one another and the incoming stream of test gas are dictated by the fact that the temperature of the gas may change if permitted to impinge against the wet bulb element first, and hence the wet bulb element $R_w$ is exposed last.

The leads from the temperature sensitive elements are enclosed within a sheath or harnessed as at 142 and lead to the other resistive elements of the bridge. The said other elements, exclusive of the galvanometer 144 are housed in any suitable structure 146 on the interior of the casing 100, since they occupy very little volume. The electrical power for a regulated source of potential is brought in by usual means such as conventional leads 148. It may be considered that the view is diagrammatic to the extent that the power supply may include vacuum tubes, condensers, chokes, or transistors and the like all disposed in the structure 146. Leads 150 comprising the detector portion of the bridge 65 energize the galvanometer 144. It will again be pointed out that means may be provided to use detection means other than a galvanometer for recording, automatic control and the like.

Since minimum air flow is required in order to assure stability of the wet bulb temperature, an air velocity anemometer 152 is also associated with the apparatus and disposed in the casing 100. The differential conduits 154 and 156 for the anemometer 152 open respectively at 158 in the rear wall of the chamber 118 on the left side thereof, and in the conduit 112.

There is no need to explain the operation of the device illustrated in FIG. 11 since sufficient explanation has already been given. Once the power has been applied from the outside source, and the air or test gas is flowing through at a proper rate depending upon the physical size of the components, the meter 144 reads dew-point directly and continuously. It is easily calibrated and the proper scale provided over the range for which the equipment has been built. If desired, additional equipment can be positioned on the same casing, such as for example, means reading ambient temperature of the test gas, but these refinements have no bearing on the invention as such.

Throughout this specification, reference has been made to the fact that the meter in the detection branch of the bridge reads dew-point directly. This, of course, is based upon the fact that the meter scale has been specifically calibrated to convert its normal current scale to a dew-point scale. Since other quantities are directly related to dew-point, the scale may alternately or also be calibrated to read such quantities such as water vapour pressure, amount of moisture, and the like. Because of this, the usage of terms "dew-point," "quantity related to dew-point," or the like, both in the specification and claims is intended to encompass dew-point as well as those quantities which are directly related to dew-point such that through the teachings of this invention a direct reading or direct acting detection means can be constructed.

It will be manifest that the invention is embodied in highly simplified structure, notwithstanding the length of the explanation herein. Such explanation has been greatly detailed in order to afford a complete appreciation of the advance clearly made in the arts and sciences by this invention. The many benefits and advantages of the invention are capable of being secured and realized through a variety of different constructions which all utilize the basic concepts of the invention as expressed in the appended claims, but vary in the details and arrangements of the elements, not only insofar as physical structure is concerned, but also insofar as electrical circuitry.

What it is desired to secure by Letters Patent of the United States is:

1. Apparatus for providing an electrical quantity directly related to the dew-point of a test gas substantially independent of the change in ambient temperature of said gas comprising an electrical network, a source of potential energizing said network, one branch of said network having a temperature sensitive resistance element exposed to said test gas and moistened and having its resistance varying directly as the wet bulb temperature of said test gas, a second branch of said network having a second temperature sensitive resistance element therein subjected to the ambient temperature of said test gas and having resistance characteristics which vary in predetermined relation with respect to the wet bulb temperature of the test gas maintained at a constant predetermined dew-point, and a third branch of said network having computing means therein for comparing the effects of said potential upon said temperature sensitive elements to produce said electrical quantity as a current in said third branch, and detecting means for detecting said current.

2. Apparatus as claimed in claim 1 in which said network has means for correcting the current of the third branch to adjust the characteristics of constant dew-point for changes in ambient temperature at the higher values of dew-point.

3. Apparatus for providing an electrical quantity directly related to the dew-point of a test gas substantially independent of the change in ambient temperature of said gas comprising an electrical network, a source of potential energizing said network, one branch of said network having a temperature sensitive resistance element exposed to said test gas and moistened and having its resistance varying directly as the wet bulb temperature of said gas, a second branch of said network having a second temperature sensitive resistance element also exposed to said test gas but not moistened, and having resistance means connected therewith to adjust the resistance characteristics of said second branch to follow the wet bulb temperature of said test gas as though its dew-point remained at substantially a constant value irrespective of changes in ambient temperature thereof, said network having means for continuously comparing the resistances of said first and second branches and indicating such comparison by means of a current which comprises said quantity, and means for detecting said current.

4. Apparatus for providing an electrical quantity directly related to the dew-point of a test gas substantially independent of change of ambient temperature of said gas which comprises, a Wheatstone bridge having potential terminals and detector terminals, a source of potential across the potential terminals, two pairs of resistance branches connected between the terminals in the conventional manner, and a detector leg across the detector terminals having detection means therein, a temperature sensitive wet bulb resistance element in one of said resistance branches and being moistened and exposed to said test gas, and temperature sensitive resistance means in one of the other three branches the resistance of which varies in predetermined relation with respect to the wet bulb temperature of the test gas maintained at a constant predetermined dew-point and said resistance means being subjected to the temperature of said test gas, the condition of imbalance of said bridge being indicated by the current in said detection means and the current comprising said electrical quantity.

5. Apparatus as claimed in claim 4 in which said temperature sensitive resistance means comprises an electrical network in one of the branches adjacent the said wet bulb resistance element and having a coefficient of temperature change in phase with that of the said wet bulb resistance element.

6. Apparatus as claimed in claim 4 in which said temperature sensitive resistance means comprises an electrical network in the branch opposite said wet bulb resistance element and having a coefficient of temperature change of opposite phase as that of said wet bulb resistance element.

7. Apparatus as claimed in claim 4 in which said temperature sensitive resistance means comprises an electrical network including a second resistance element said substantially similar to that of said wet bulb resistance element exposed to said test gas but not moistened, and having a passive resistance element connected thereto whereby to adjust the resistance in said one other branch.

8. Apparatus for providing a current which varies substantially directly as the dew-point of a test gas over a predetermined range of dew-point substantially independent of changes in the ambient temperature of said gas over a predetermined range of ambient temperatures, which comprises, a bridge having a source of potential connected therewith and providing resistive branches and a balance portion adapted to have zero current therein when said bridge is balanced, said current adapted to appear in said balance portion, one resistive branch having a temperature sensitive element therein exposed to said test gas and moistened and affecting the resistance of said one resistive branch to vary directly as the wet bulb temperature of said test gas, the bridge having temperature sensitive means in an arm adjacent to the one temperature sensitive element which is subjected to the ambient temperature of said test gas and having electrical characteristics to provide a resistance in said branch which varies directly as the wet bulb temperature of said test gas as though maintained at a constant dew-point at the lower end of said range, whereby the bridge will be substantially balanced when the test gas has a dew-point corresponding to said constant dew-point at said lower end over substantially said entire ambient range.

9. Apparatus as claimed in claim 8 in which said temperature sensitive means has a temperature coefficient in the same phase as that of said temperature sensitive element, is located in a branch adjacent said one branch, and is exposed to said test gas but not moistened.

10. Apparatus as claimed in claim 8 in which the temperature sensitive means in said other branch is chosen to affect the bridge in a manner such as to provide maximum current in said balance portion when the dew-point of said test gas is at the higher end of said dew-point range at an ambient temperature between the ends of the ambient range.

11. Apparatus as claimed in claim 10 in which said bridge has means for correcting the current for the errors occurring at the higher and lower ends of the ambient range for the higher values of dew-point in said dew-point range.

12. Apparatus as claimed in claim 10 in which said bridge has means for correcting the current for the errors occurring at the higher and lower ends of the ambient range for the higher values of dew-point in said dew-point range, comprising temperature sensitive means external of said bridge exposed to said test gas, for adjusting the current supplied to said bridge and varying the same in a manner to provide for the correction of current in said balance portion.

13. Apparatus as claimed in claim 10 in which said bridge has means for correcting the current for the errors occurring at the higher and lower ends of the ambient range for the higher values of dew-point in said dew-point range, comprising a negative coefficient temperature sensitive network in series with said source of potential to vary the current of said bridge and being exposed to said test gas.

14. Apparatus as claimed in claim 10 in which said bridge has means for correcting the current for the errors occurring at the higher and lower ends of the ambient range for the higher values of dew-point in said dew-point range, comprising temperature sensitive means in said balance portion exposed to said test gas and varying the current of said balance portion.

15. Apparatus as claimed in claim 4 in which means are provided in one of said branches adjacent that containing said wet bulb resistance element for varying the total resistance of said branch manually and calibrated to control the current in said detecting means in accordance with changes in barometric pressure.

16. Apparatus for providing a current which varies substantially directly as the dew-point of a test gas over a predetermined range of dew-point substantially independent of changes in ambient temperature, which comprises a Wheatstone bridge having potential terminals and a source of potential connected across said terminals, detecting terminals and a detection branch connected across said detecting terminals and having detecting means in said branch, said current adapted to appear in said detecting means, one balance branch having a continuously moistened, positive coefficient temperature sensitive element therein exposed to the test gas, a second balance branch being adjacent the first and having a second positive coefficient temperature sensitive element therein together with modifying resistance means chosen to cause the resistance of said second branch to follow an approximation of the wet bulb temperature versus ambient temperature characteristic over said ambient range for a constant dew-point at the lower end of said dew-point range, said second element also being exposed to said test gas but not moistened, passive resistance means in the other two balance branches, the bridge resistance values being chosen to give zero current in said detection branch when the dew-point of said test gas is the same as said constant dew-point at an ambient temperature in the middle of said ambient temperature range.

17. Apparatus as claimed in claim 16 in which said modifying resistance means are passive and said approximation is a linear function corresponding to said constant dew point.

18. Apparatus as claimed in claim 16 in which said modifying resistance means include temperature sensitive means also exposed to said test gas and said approximation is curved to cause the same to substantially coincide with said characteristic.

19. Apparatus as claimed in claim 16 in which means are provided to correct the error in said current occurring at the ends of said ambient temperature range for dew-points at the upper end of said dew-point range.

20. Apparatus as claimed in claim 16 in which means are provided to correct the error in said current occurring at the ends of said ambient temperature range for dew-points at the upper end of said dew-point, comprising a negative coefficient temperature sensitive element also exposed to said test gas in series with said source of potential, and means adjusting the total impedance of said circuit including the bridge and source of potential, whereby the correction of error in the current of the detection branch is corrected by varying the current supplied to the bridge.

21. Apparatus as claimed in claim 20 in which said first and second temperature sensitive elements comprise identical metal bulbs and the negative temperature sensitive element comprises a thermistor.

22. Apparatus for providing an electrical quantity which is related to the dew-point of a test gas irrespective of the ambient temperature of the gas, which comprises, a bridge having a pair of resistance arms in balancing relation in the bridge, one arm having a temperature sensitive resistance element therein subjected to constant flow of the test gas, means moistening the temperature sensitive resistance element whereby its resistance varies directly as the wet bulk temperature of the said test gas, the other arm having means therein simulating a temperature sensitive wet bulb element subjected to a standard gas substantially identical to the test gas but having constant dew-point of predetermined value, said simulating means including at least a second temperature sensitive resistance element also subjected to constant flow of said test gas but not moistened and whose resistance value varies in predetermined relation with respect to the wet bulb temperature for said test gas maintained at said predetermined dew-point, the bridge having output terminals and the arms being compared across said output terminals, a source of potential energizing the bridge, and means for continuously detecting the current flow between said terminals as a direct measurement of the dew-point of said test gas.

23. Apparatus as claimed in claim 22 in which said simulating means includes, in addition a passive resistor connected to modify the response of said second temperature sensitive resistance element.

24. Apparatus for providing an electrical quantity directly related to the dew-point of a test gas substantially independent of the change in ambient temperature of said gas comprising an electrical network, a source of potential energizing said network, one branch of said network having a temperature sensitive resistance element exposed to said test gas and moistened and having its resistance varying directly as the wet bulb temperature of said test gas, a second branch of said network having a second temperature sensitive resistance element therein, said second element comprising a wet bulb element moistened and exposed to a standard gas of a constant predetermined dew-point and having resistance characteristics which vary in a predetermined relation with respect to the wet bulb temperature of the test gas maintained at a constant predetermined dew point, a third branch of said network having computing means therein for comparing the effects for said potential upon said temperature sensitive elements to produce said electrical quantity as a current in said third branch, and detecting means for detecting said current.

25. Apparatus for providing an electrical quantity directly related to the dew-point of a test gas substantially independent of the change in ambient temperature of said gas comprising, a Wheatstone bridge having potential terminals and detector terminals, a source of potential across the potential terminals, two pairs of resistance branches connected between the terminals in a conventional manner, and detector means connected across the detector terminals, a temperature sensitive wet bulb resistance element in one of said resistance branches and being moistened and exposed to said test gas, and temperature sensitive resistance means in one of the other three branches the resistance of which varies in predetermined relation with respect to the wet bulb temperature of the test gas maintained at a constant predetermined dew-point, said temperature sensitive resistance means comprising a standard cell having a second wet bulb resistance element exposed to a standard gas of said predetermined constant dew-point and having the same ambient temperature as said test gas, the condition of unbalance of said bridge being indicated by the current in said detection means and the current comprising said electrical quantity.

26. Apparatus as claimed in claim 25 in which said second wet bulb resistance element has substantially the same temperature coefficient as said first and said standard cell is connected in an adjacent branch of said bridge.

References Cited in the file of this patent
UNITED STATES PATENTS

| | | |
|---|---|---|
| 1,855,774 | Schneider | Apr. 26, 1932 |
| 2,501,377 | Cherry | Mar. 21, 1950 |
| 2,603,972 | Kahn | July 22, 1952 |
| 2,638,783 | Rittner et al. | May 19, 1953 |
| 2,687,035 | Minter | Aug. 24, 1954 |

FOREIGN PATENTS

| | | |
|---|---|---|
| 830,667 | France | May 6, 1938 |